(12) United States Patent
Burchardt et al.

(10) Patent No.: US 8,039,150 B2
(45) Date of Patent: Oct. 18, 2011

(54) AGGLOMERATED ZINC POWDER ANODE

(75) Inventors: Trygve Burchardt, Trondheim (NO); Romuald Franklin Ngamga, Männedorf (CH)

(73) Assignee: Revoit Technology Ltd., Dublin (IE)

( * ) Notice: Subject to any disclaimer, the term of this patent is extended or adjusted under 35 U.S.C. 154(b) by 0 days.

(21) Appl. No.: 11/407,348

(22) Filed: Apr. 20, 2006

(65) Prior Publication Data

US 2006/0257744 A1    Nov. 16, 2006

Related U.S. Application Data

(60) Provisional application No. 60/693,415, filed on Jun. 24, 2005.

(30) Foreign Application Priority Data

Apr. 20, 2005 (EP) ..................................... 05075940

(51) Int. Cl.
  H01M 4/42    (2006.01)
  H01M 4/34    (2006.01)
  H01M 4/66    (2006.01)
(52) U.S. Cl. ......... 429/229; 429/217; 429/219; 429/222
(58) Field of Classification Search .................. 429/40, 429/134, 218.1, 219, 229; 252/182.1
  See application file for complete search history.

(56) References Cited

U.S. PATENT DOCUMENTS

| | | | |
|---|---|---|---|
| 3,617,384 A * | 11/1971 | Kamai et al. ................... | 136/30 |
| 3,873,367 A | 3/1975 | Kandler | |
| 3,923,544 A | 12/1975 | Berchielli | |
| 4,304,828 A | 12/1981 | Vaidyanathan | |
| 4,407,915 A | 10/1983 | Brown | |
| 4,492,744 A | 1/1985 | Brown et al. | |
| 4,842,963 A | 6/1989 | Ross, Jr. | |
| 4,968,569 A | 11/1990 | Chiba et al. | |
| 5,525,444 A | 6/1996 | Ito et al. | |
| 5,780,186 A | 7/1998 | Casey, Jr. | |
| 5,863,676 A * | 1/1999 | Charkey et al. ............... | 429/229 |
| 6,284,410 B1 * | 9/2001 | Durkot et al. ................. | 429/229 |
| 6,472,103 B1 | 10/2002 | Durkot et al. | |
| 2003/0113630 A1 | 6/2003 | Kainthla et al. | |

FOREIGN PATENT DOCUMENTS

| | | |
|---|---|---|
| CA | 2506295 A1 | 5/2005 |
| EP | 1430976 A | 6/2004 |
| EP | 1715536 A2 | 10/2006 |
| EP | 1769549 A1 | 4/2007 |
| FR | 2264401 | 10/1975 |
| GB | 1419785 | 12/1975 |
| JP | 07254407 A * | 10/1995 |
| NO | 20034702 | 10/2003 |

(Continued)

OTHER PUBLICATIONS

The Secondary Alkaline Zinc Electrode; Frank R. McLarnon and Elton J Cairns; Journal of the Electrochemical Society, vol. 138 No. 2; Feb. 1991.*

(Continued)

*Primary Examiner* — Keith Walker
(74) *Attorney, Agent, or Firm* — Foley & Lardner LLP

(57) ABSTRACT

Zinc electrodes for use in batteries, the electrode containing an organic gelling agent, an organic binding agent, calcium zincate and an electro-active element. A method of manufacturing such electrodes, and use of such electrodes in primary and secondary batteries.

45 Claims, 9 Drawing Sheets

FOREIGN PATENT DOCUMENTS

| WO | WO 97/17737 | 5/1997 |
| --- | --- | --- |
| WO | WO 03/050906 A1 | 6/2003 |
| WO | WO 03/054988 A2 | 7/2003 |
| WO | WO 2005/011026 A2 | 2/2005 |
| WO | 2006012313 A1 | 2/2006 |
| WO | WO 2006/111835 A1 | 10/2006 |

OTHER PUBLICATIONS

European Search Report for Application No. EP 05075940, dated Sep. 10, 2007.
Final Search Report for European Application No. 05075940, dated Oct. 12, 2007, 10 pages.
International Report on Patentability for International Application No. PCT/IB2006/00939, dated Oct. 23, 2007, 7 pages.
International Search Report for International Application No. PCT/IB2006/00939, dated Aug. 28, 2006, 3 pages.
McLarnon et al., The secondary alkaline zinc electrode, Journal of the Electrochemical Society, Feb. 1, 1991, pp. 645-656, Electrochemical Society, Manchester, New Hampshire, United States of America.
Partial Search Report for European Application No. 05075940, dated Dec. 2, 2005, 4 pages.
Skelton et al., Improved silver/zinc secondary cells for underwater applications, Journal of Power Sources, 1997, pp. 39-45, vol. 65.
Zhang et al, Study of the Performance of secondary alkaline pasted Zinc electrodes, Journal of Applied Electrochemistry, Sep. 2001, pp. 1049-1054, vol. 31, No. 9, Springer, Dordrecht, NL.

\* cited by examiner

AGGLOMERATED ZINC POWDER ANODE

This invention relates to electrodes for batteries, and in particular, to zinc electrodes and to a method of manufacturing such electrodes.

BACKGROUND

Batteries having the combined characteristics of high capacity, high power, rechargeability, long discharge/charge cycle life, minimum size and weight, economy of manufacture, and environmental safety remain to be developed.

Zinc (Zn) has been used in many battery applications as the anode material. This is due to the high energy capacity of zinc and to its chemical stability in the electrolyte. Zinc electrodes provide high current densities and a flat discharge curve. Battery systems such as nickel-zinc, silver-zinc, zinc-chloride, zinc-bromide, zinc-manganese etc. are well known. A zinc electrode can be made from a solid plate, pellets or powdered zinc materials.

If a powdered zinc material is used for the electrode, an organic gelling agent may be added to allow sufficient electrolyte penetration and to maintain Zn—Zn particle contact area. This is important in order to obtain high electronic conductivity. However, there are problems associated with the use of such gelling agents, including their tendency to break up due to repeated swelling and contraction of the zinc electrode, destruction of the uniformity of distribution of zinc powder by impact and the formation of passive layers under high discharge current densities. Accordingly an object of the present invention is to provide an electrode with improved Zn—Zn particle contact area.

Reaction rate at a zinc electrode made from zinc powder is dependent on active surface area and so theoretically shape and available surface area of the zinc particles should be optimal to give best performance. Various additives have also been used in zinc electrodes in an attempt to increase activity and stability. For example, graphite has been added to electrodes to increase particle-particle contact area and calcium zincate has been used to improve the stability.

A further object of the present invention is to provide a zinc electrode with increased activity and stability.

For secondary batteries with zinc as the active anode material, low cost and relatively high energy density can be obtained but this is offset by the short cycle life of the battery. Charging the zinc electrode results in deposition of zinc on the electrode surface and on previously deposited zinc in the form of zinc crystals or dendrites. The build up of zinc on the outer electrode surface may block the interior electrode surface and reduce the capacity of the system after repeated charge and discharge cycling. In addition zinc dendrites spread out forming needle like zinc crystals penetrating the cell separator and causing short circuit of the battery system.

Shape change is defined as the migration of zinc. Most common is the migration from the top and sides of the electrode to the bottom. This is due in part to the dissolution of zinc during the discharge cycle. Zinc, in oxide form, and partially dissolved in potassium hydroxide, is moved to other areas of the electrode. Movement occurs down the concentration gradient of the dissolved zinc hydroxides and so zinc is moved to other areas of the electrode, to a great extent in the lower portion, where the zinc is redeposited on charge. During charge/discharge cycles, the general tendency is for zinc to leave certain areas of the electrode and concentrate in other areas. Usually zinc is concentrated in the lower part of the electrode due to gravitational forces, causing the lower portion of the electrode to become denser than the upper part. Potential differences over the electrode surface may also result in local shape changes.

Prevention of this zincate diffusion within the battery is the main challenge for obtaining rechargeable zinc batteries. Zinc is extremely soluble in strong alkaline environments. The high solubility allows for rapid current spikes typically unattainable with other battery systems. However, zinc diffusion leads to the well-known phenomena of electrode shape change and the presence of zinc dendrites within the battery.

Attempts to control shape change and dendrite formation include:
- redistribution of zinc by starting out with zinc depleted at the centre and agglomerated at the edge;
- modifying the electric field experienced by the zinc electrode;
- using separators resistant to zinc dendrites;
- decreasing the solubility of zinc by using complexing agents.

Incorporation of binders such as polytetrafluoroethylene (PTFE) in battery electrodes in an attempt to reduce shape changes is also known, but one particular problem in this context is that when PTFE alone is incorporated into the electrode, the PTFE tends to coagulate as a film on the outside of the electrode during cycling. This not only reduces the useful effect of the binder in avoiding shape changes but also increases the resistance of the electrochemical cell, including the electrode.

French Patent No. 2264401 describes a secondary zinc electrode which is produced by applying to a collecting grid a non-hardened mixture containing particulate zinc oxide, a binder such as PTFE, and other substances, such as rayon fibres or metal powders. However, this electrode still suffers from problems of dendritic growth and, in particular, shape changes or deformations, probably as a result of movement of the electrolyte parallel to the surface of the electrode during the charge and discharge cycles.

A further possible approach to controlling shape change and dendrite formation in rechargeable zinc electrodes is by containing the zinc in a matrix by encapsulation, typically using a gelling agent. Organic gelling agents with high ionic conductivity, such as acrylate polymers (e.g. CARBOPOL), can be used to encapsulate zinc powder. With the use of gelling agents the multiplicity of pores and the high tortuous paths within the resulting matrix limit the mobility of zinc oxide/zinc hydroxide during the discharge of a battery and, thereby, retard the migration of zinc, which is equivalent to shape changes in a conventional zinc electrode. Thus the cycling of the battery is extended.

A problem with such gelling agents is their tendency to break up due to repeated swelling and contraction of the zinc electrode which occurs due to the volumetric difference between the metallic zinc and the zinc oxides because the density of ZnO is lower than that of Zn. As the electrolyte is saturated with zincate, ZnO (zinc oxide) will be deposited. With encapsulated zinc particles this deposition will occur inside the encapsulation and as a consequence changes in the size of the electrode occur which can break up the encapsulating effect of the gelling agent around the zinc particles.

Due to the density variations in the electrode the encapsulating effect of the polymer gelling agent is removed. Open channels are produced in the electrode structure allowing transport of zinc ions and subsequently the build-up of dendrites or shape changes on the electrode during charging.

A further problem with such gelling agents is the swelling nature of the agents when in contact with the alkaline electrolyte (e.g. KOH) due to incorporation of the electrolyte into the organic polymer. Such swelling of the polymer may result in both positive and negative effects on the electrode. Severe swelling results in an increased particle contact resistance within the electrode as the zinc particles are removed from each other under repeated charge/discharge cycling. This reduces the capacity of the system and limits the number of charge/discharge cycles. The current collector pressed into the electrode or implemented in the battery can also suffer from these effects as part of it loses electronic contact with the zinc matrix. In addition dry spots can occur in the electrode, reducing the utilisation of zinc.

However, if the electrode swells to a lesser extent a positive effect may be observed in that it may result in the formation of a thin electrolyte layer around the zinc particles which can give superior discharge characteristics.

Further drawbacks with such gelling agents are destruction of the uniformity of distribution of zinc powder by impact and the formation of passive layers under high discharge current densities.

An object of the present invention is to provide a zinc electrode which is stable after repeated charge/discharge cycling.

SUMMARY OF THE INVENTION

In a first aspect, the present invention provides an electrode for a secondary battery comprising zinc powder as active electrode material, the electrode further comprising an organic gelling agent, an organic binding agent, calcium zincate and an electro-active element for increasing the electrochemical activity of the electrode under charge and discharge.

The resulting electrode is able to deliver high current densities with good stability at low overpotentials and both high ionic and electronic conductivity are maintained within the electrode after repeated charge/discharge cycling.

As used herein, the term "gelling agent" relates to a polymeric material with high $OH^-$ conductivity. The function of the gelling agent within the electrode is to form a three dimensional ion conductive structure in the electrode covering the zinc particles reducing zincate mobility and thereby reducing the tendency to dendrite formation. Ionic conductivity of the gelling agent is obtained as the electrolyte (for example aqueous potassium hydroxide) is absorbed into the polymer structure which in turn has a tendency to swell the polymer structure. The term "binding agent" relates to a polymeric material which does not absorb $OH^-$ and maintains the mechanical stability of the electrode. The function of the binding agent within the electrode is to counteract the tendency of the gelling agent to swell on absorption of the electrolyte thereby reducing shape changes and dendrite formation with repeated charge/discharge cycles.

Preferably the zinc powder has a particle size distribution by weight such that:
(i) at least 90% of the particles have a size within the range 5 to 400 μm;
(ii) at least 25% of the particles are large particles with a size of 100 μm or greater; and
(iii) at least 25% of the particles are small particles with a size of less than 100 μm; large and small particles being intimately distributed to facilitate particle to particle contact area.

The use of such a zinc powder gives a good pore size distribution within the electrode and high particle-particle contact. An almost bimodal particle size distribution is provided with large particles which would leave gaps in the packing of the particles and small particles which will fill in those gaps. Such a particle size distribution allows low ohmic losses to be obtained and no passivation is observed even at high reaction rates.

Preferably the zinc powder has at least 25% of large particles with a size greater that 200 μm. More preferably the zinc powder has at least 30% of large particles with a size greater than 200 μm and at least 30% small particles with a size less than 100 μm. Optionally the zinc powder is formed as a mixture of first and second zinc powders, the first zinc powder comprising predominantly large particles with a size of 100 μm or greater and the second zinc powder comprising predominantly small particles with a size of 100 μm or less. Preferably the first zinc powder has at least 90% by weight of particles in the range 75 to 400 μm and the second zinc powder has at least 80% by weight particles less than 100 μm. Preferably the first and second zinc powders are in a weight ratio of 1:4 to 4:1, most preferably about 1:1. The use of two grades of zinc powder gives improved charge/discharge stability and allows high current densities without passive film formation.

The gelling agent is a polymer with high $OH^-$ conductivity which effectively controls the fluidity of the electrode. Optionally, the polymer may be in powder form, such as carboxymethyl cellulose, methyl cellulose, hydroxypropyl methyl cellulose, polyvinyl alcohol, polyethylene oxide, polyacrylate or salts thereof, or the polymer may be a granular gelling agent selected from cross-linked and branched type (meth) acrylates and salts thereof (such as CARBOPOL), carboxymethyl cellulose, methyl cellulose, hydroxypropyl methyl cellulose, polyvinyl alcohol, starch or a starch derivative. The gelling agent is preferably present in an amount of less than 5 wt %, most preferably 0.5 wt % to 2 wt %.

The binding agent is a polymer or plastics material that reduces swelling of the electrode. The polymer may preferably be selected for example from polytetrafluoroethylene (PTFE), polyethylene, polypropylene, and rubber polymers. The employment of such a polymer, preferably PTFE, improves the strength of the electrode. Preferably, the binding agent is present in an amount less than 4 wt %, most preferably less than 3 wt % or less than 2 wt %.

The calcium zincate component provides Ca-ions in the matrix of the zinc electrode which reduces dendrite growth from the electrode by causing rapid deposition of zincate within the electrode matrix, thereby preventing diffusion of Zn-ions. An additional effect of calcium zincate is increased stability of the current density under discharge and prevention of passive film formation especially at high current densities. Calcium zincate may be present in an amount of 5 wt % or less which helps to maintain reasonable reaction rates. Higher amounts of calcium zincate are preferable for extended cycle life of the electrode, but at high current densities an activator material that increases the reaction rate should also be added. Accordingly, the electrode further comprises an electro-active element. The effect of adding such an electro-active element is that electrochemical activity is increased under both charge and discharge and remains high even with the addition of zincate. The electro-active element is preferably a metal oxide in which the metal has at least as high electronic conductivity as Zn. Preferred electro-active elements include silver oxide, $Ag_2O$; aluminium oxide, $Al_2O_3$; zinc oxide, ZnO and cobalt oxide, CoO. Preferably the electrode comprises silver oxide or cobalt oxide in an amount of 2 wt % or less. Such electro-active elements may be usefully used in zinc electrodes for secondary batteries or for high power primary batteries.

In a second aspect the present invention provides a method of forming a zinc electrode for a secondary battery comprising the following steps:
  providing zinc powder;
  mixing the zinc powder with calcium zincate and an electro-active element and pressing the powder into an organic binding agent forming an agglomerate;
  mixing a gelling agent with the agglomerate;
  adding an electrolyte to form a paste; and
  pressing a current collector into said paste.

In a third aspect the present invention relates to the use of the zinc electrode described above in a zinc-air battery, a zinc-silver battery or a zinc/nickel battery for portable electronics applications.

In a fourth aspect the invention provides a secondary battery containing a zinc electrode as described above or made according to the method described above, wherein the battery is a zinc-air battery, a zinc-silver battery or a zinc/nickel battery.

BRIEF DESCRIPTION OF DRAWINGS

The invention will be described with reference to the following drawings, in which.

DETAILED DESCRIPTION OF THE INVENTION

Figure 1:
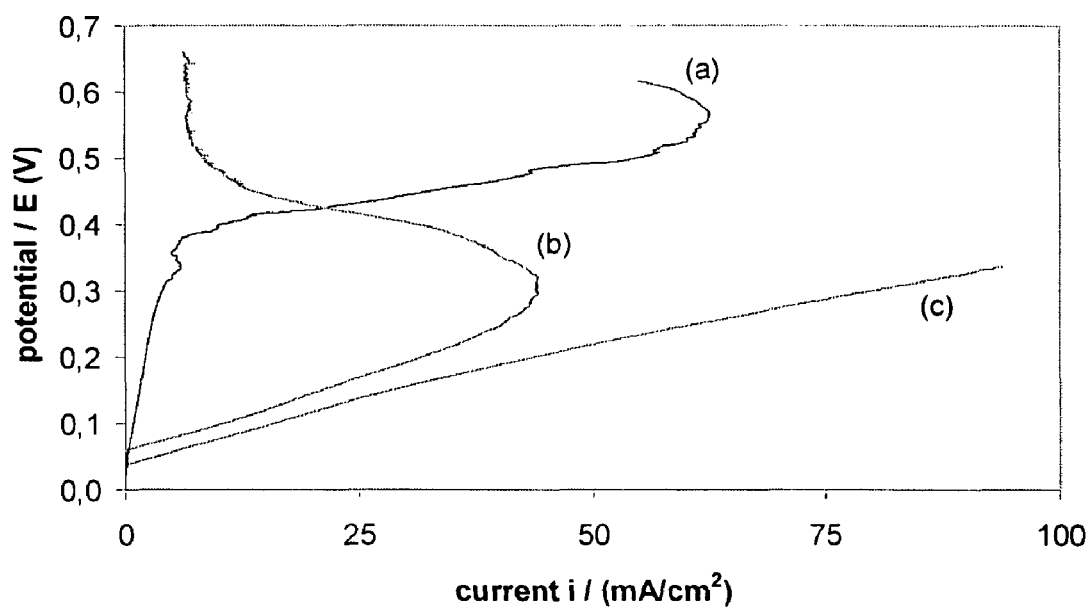
FIG. 1 shows the results from potentiodynamic sweeps on electrodes comprising (a) zinc alloy GN10 (powder of small particle fraction), (b) zinc alloy GN40 (powder of large particle fraction) and (c) 1:1 zinc alloy GN10 and GN40.

The invention provides new zinc electrodes. The electrode according to a first aspect of the invention comprises zinc powder as the active electrode material and the electrode also includes an organic gelling agent, an organic binding agent, calcium zincate and an electro-active element. The electrode reduces and preferably prevents dendrite formation and unwanted shape changes of the electrode and is able to deliver high current densities with good stability at low overpotentials.

The amount of gelling agent is preferably <5 wt %, more preferably 0.5 wt % to 2 wt %. The use of a larger amount of gelling agent increases the contact resistance between zinc particles and gives a reduction in the volume available for the addition of zinc. If the amount of gelling agent is too low this will affect the utilisation of zinc in the electrode and the dendrite inhibiting properties.

As described previously, problems with gelling agents include swelling when in contact with the electrolyte, destruction of the uniformity of the zinc powder by impact and the formation of passive layers under high discharge current densities.

Accordingly, in a first aspect the present invention relates to an electrode in which the mobility of zincate ions resulting from the dissolution of zinc under discharge is reduced by encapsulating zinc particles with a gelling agent. Further, the negative effects due to swelling of the zinc electrode as described above are prevented by adding one or more binding agents.

The binding agent is made from an inert material that does not take part in any reactions during charge/discharge cycles. The object of adding the binding agent is to maintain high ionic and electronic conductivity within the zinc electrode as the electrode undergoes swelling due to the gelling agent and due to variations in density caused by zinc oxide formation during discharge. The binding agent may be a polymer/plastics material that increases the binding properties of the zinc electrode thereby preventing dendrite/shape change properties of the zinc agglomerate or clay or slurry. Examples of binding agents are polytetraflouroethylene (PTFE), polyethylene, polypropylene, and rubber polymers (for example the latex of styrene-butadiene rubber (SBR), the latex of acrylonitril-butadiene rubber (NBR) and the latex of ethylene-propylene-diene monomer (EPDM)).

The effect of the binding agent is the formation of a mechanically strong zinc powder agglomerate with good zinc particle-particle contact, and a high exposed surface area. An additional benefit observed on addition of the binding agent to the zinc powder is that at high dissolution rates the formation of a passive layer is reduced, thus giving better stability at high loads.

The amount of the binding agent should be <4 wt %, preferably <3 wt %, to maintain high electronic conductivity of the electrode. With the content of PTFE lower than 2 wt % the reaction rate of the electrode is in the same range as electrodes without PTFE. However, such electrodes with PTFE show enhanced charge/discharge stability.

It is preferable to employ a mixed polymer comprising a binding agent polymer and a gelling agent polymer. The employment of the binding agent polymer, preferably PTFE, improves the strength of the electrode. Meanwhile, the employment of the gelling agent polymer effectively controls the fluidity of the electrode.

In the electrode of the invention the expansion due to ZnO formation is preferably prevented by the addition of ZnO inside the electrode matrix under preparation. When charging the electrode a void is then created within the electrode. This void is then filled under discharge without expanding the electrode.

The active electrode material comprises zinc powder which preferably has a particle size distribution by weight such that:
(i) at least 90% of the particles have a size within the range 5 to 400 µm;
(ii) at least 25% of the particles are large particles with a size of 100 µm or greater; and
(iii) at least 25% of the particles are small particles with a size of less than 100 µm; large and small particles being intimately distributed to facilitate particle to particle contact area.

The use of such a zinc powder gives a good pore size distribution within the electrode and high particle-particle contact. An almost bimodal particle size distribution is provided with large particles which would leave gaps in the packing of the particles and small particles which will fill in those gaps. Such a particle size distribution allows low ohmic losses to be obtained and no passivation is observed even at high reaction rates.

Preferably the zinc powder has at least 25% of large particles with a size greater that 200 µm. More preferably the zinc powder has at least 30% of large particles with a size greater than 200 µm and at least 30% small particles with a size less than 100 µm. Optionally the zinc powder is formed as a mixture of first and second zinc powders, the first zinc powder comprising predominantly large particles with a size of 100 µm or greater and the second zinc powder comprising predominantly small particles with a size of 100 µm or less. Preferably the first zinc powder has at least 90% by weight of particles in the range 75 to 400 µm and the second zinc powder has at least 80% by weight particles less than 100 µm. Preferably the first and second zinc powders are in a weight ratio of 1:4 to 4:1, most preferably about 1:1. The use of two grades of zinc powder gives improved charge/discharge stability and allows high current densities without passive film formation.

The active electrode material also comprises calcium zincate $(Ca(OH)_2 \cdot nZn(OH)_2 \cdot nH_2O)$ and an electro-active element. The addition of Ca-ions in the matrix of the zinc electrode reduces dendrite growth from the electrode. The effect of the Ca-ions is a rapid deposition of zincate within the electrode matrix, thereby preventing the diffusion of Zn-ions. Incorporation of Ca-ions into the electrode can be achieved by adding calcium zincate to the electrode to obtain Ca-ion rich areas close to the zinc particles and within the encapsulated agglomerates of zinc powder and additives.

An additional effect of calcium zincate is increased stability of current density under discharge. This is probably due to the fact that a mixture of ZnO and zincate is formed around the zinc particles. This prevents passive film formation especially at high current densities.

An undesired effect of zincate additives is the reduced reaction rate of zinc. Only a small amount (<5 wt %) calcium zincate can be added whilst maintaining reasonable reaction rates. However, for extended cycle life of the electrode higher amounts of calcium zincate are preferable, and therefore at high current densities an electro-active element or activator (material that increases the reaction rate) should be added.

Electro-active elements, such as metal oxides, are added to the zinc electrode in order to increase electrochemical activity under both charge and discharge. One explanation for this increased electrochemical activity is that the addition of metal oxides increases the available surface area of zinc by activating the reaction sites for reduction and oxidation of zinc. In addition, the particles of metal oxides distributed inside the electrode increase the particle-particle contact area. Thereby the ohmic resistance of the electrode is reduced.

Any metal oxide may be used to achieve an increase in the reaction rate of zinc in an electrode, but the electro-active element is preferably a metal oxide in which the metal has at least as high electronic conductivity as Zn. Both silver oxide powder $(Ag_2O)$ and cobalt oxide powder $(CoO)$ have shown to give good results. Other preferred electro-active elements include aluminium oxide, $Al_2O_3$ and zinc oxide, $ZnO$. Small amounts of $Ag_2O$ (<8 wt %) increase the current density of the electrode under both charge and discharge. This is probably partly due to the redox reactions of $Ag_2O$ during charge/discharge of the battery. For battery applications AgO is used as the cathode material in zinc-silver batteries. AgO is reduced to $Ag_2O$ under discharge and $Ag_2O$ is oxidised to AgO under charge. AgO will oxidise Zn resulting in ZnO and $Ag_2O$ formation.

The effect of $Ag_2O$ in the matrix of the electrode is mostly observed after a few initial (3-10) charge/discharge cycles. This indicates that the effect of $Ag_2O$ is probably due to the redox properties of $Ag_2O$ and surface reactions with Zn. It is observed that silver oxide accumulates at the electrolyte side of the zinc electrode after repeated charge/discharge cycling. This might also contribute to the positive effects observed with silver oxide additives.

A zinc electrode comprising calcium zincate and an electro-active element as described above may be used advantageously in high power primary batteries or secondary batteries, including battery systems such as nickel-zinc, silver-zinc, zinc-chloride, zinc-bromide, zinc-manganese etc.

Elements that can reduce the hydrogen formation from the zinc electrode may also preferably be used in the electrodes of the invention. Alloying elements, additives and inhibitors are used to reduce the rate of hydrogen formation. Alloying elements which may be used include materials with a high overpotential for the hydrogen reaction such as antimony, bismuth, gallium, indium, lead, mercury, thallium, cadmium and tin or oxides or hydroxides of such materials. Ions of these elements can be added into the electrolyte or salts can be added into the zinc powder mixture. The elements will then deposit onto the zinc surface and prevent hydrogen formation. Inhibitors that adsorb on the reaction sites for hydrogen formation can be added into the electrolyte. Inhibitors for the hydrogen reaction are well known to those skilled in the art. As used herein the term "zinc powder" also includes metal powders where the metal is zinc together with one or more alloying elements such as those described above.

Electrodes according to the present invention may used in any secondary or primary battery application known to those skilled in the art. In particular they may be used in battery systems such as nickel-zinc, silver-zinc, zinc-chloride, zinc-bromide, zinc-manganese etc.

In another aspect, the invention provides a method of producing a zinc electrode. It has been found that the method in which the zinc electrode is prepared influences dendrite formation and shape changes and the reaction rate of the electrode.

Firstly, a zinc powder is provided. This preferably consists of a powder having a particle size distribution as defined above in order to give a good pore size distribution within the electrode, and high particle-particle contact between the particles. With the use of such a particle size distribution, low ohmic losses are obtained and no passivation is observed even at high reaction rates.

Calcium zincate, an electro-active element and any other optional materials (e.g. powder additives such as activation agents, hydrogen inhibiting materials and passivation preventing materials) are added.

Next, an organic binding agent as described above is added to the powder mixture. By application of mechanical energy, the zinc powder and additives are partly pressed into the organic binder forming agglomerates.

Subsequently, an organic gelling agent as described above is added to the zinc powder and binding agent agglomerate and mixed so that the gelling agent powder surrounds the agglomerates. Mechanical force may be added to make a homogeneous mixture.

Next, electrolyte (e.g. aqueous KOH) is added to the powder mixture to form a paste. The zinc powder mixture is encapsulated by the organic gelling agent. By adding the electrolyte to the powder mixture comprising the zinc powder and additives, the gelling agent forms an ionic conductive three-dimensional structure inside the zinc material, whilst the binding agent prevents the loss of the particle-particle surface contact and the formation of unwanted electrolyte channels in the structure during charge/discharge cycling.

Finally, the conducting current collector is pressed into the paste. The conducting current collector may be formed from a mesh-like, sponge-like, fibrous or felt-like metallic porous body made of nickel, stainless steel, copper or metals coated by such metals.

EXAMPLES

The products and methods of the invention will now be illustrated by the following examples which are not intended to limiting. The scope of the invention is defined by the appended claims.

Example 1

This example shows that a distribution of the zinc particle size fraction gives high reaction rates and increased stability of the zinc electrode.

Zinc electrodes containing zinc powder and an organic gelling agent were tested. The electrodes were prepared by mixing 6 g of zinc powder with 0.18 g of Carbopol 940 (Carbopol 940 is a gelling agent which consists of a cross linked polyacrylic acid polymer). Different particle size fractions of the zinc powder were used. The zinc powders (GN10 and GN40) are products of Grillo, Germany and the Carbopol 940 is a product of BF Goodrich.

The samples were prepared by adding the Carbopol 940 to the zinc powder. The mixture was then mixed with the application of mechanical energy before 0.6 ml of aqueous KOH electrolyte (6.6 M) was added to the powders in order to form a paste. The paste was then coated on a nickel mesh used as a current collector. The mesh was bent and sandwiched over the anode layer to prepare the electrode.

Three different Zn electrodes were prepared:
(a) ZnGN10 (89% of particles<100 μm);
(b) ZnGN40 (75 μm<94% of particle<400 μm);
(c) a 1:1 ratio of ZnGN10 and ZnGN40.

Electrochemical measurement was carried out using the 1286 electrochemical interface Solartron. A Zn reference electrode and a Ni counter electrode were used. The electrolyte was a 6.6 M KOH solution. Several potentiodynamic and potentiostatic experiments were performed on the electrodes. The figures illustrate the benefit of the distribution of particle size fractions in the Zn electrode.

FIG. 1 shows the results from potentiodynamic sweeps on the electrodes. As can be seen from the figure with samples (a) (powder of small particle fraction) and (b) (powder of large particle fraction) passivation occurs at high reaction rates. On the other hand, with sample (c) (1:1 mixture of large and small particle fraction) high reaction rates are obtained.

The experiment shows that to obtain a zinc electrode with high reaction rates a combination of small particles, giving good particle-particle contact and high active surface area, and large particles, giving porosity for electrolyte penetration is essential.

Example 2

This example shows that the method of production of the electrode containing a binding agent affects the reaction rate.

The zinc electrode was prepared by mixing 5.6 g of zinc powder (consisting of 2 different particle fractions 50 wt % GN10 and 50 wt % GN40) with 0.1 g of PTFE (as the binding agent) and 0.1 g of Carbopol 940 (as the gelling agent). The zinc powder is the product of Grillo, Germany, the PTFE is the product of Dupont in USA and the Carbopol 940 is a product of BF Goodrich.

Figure 2:
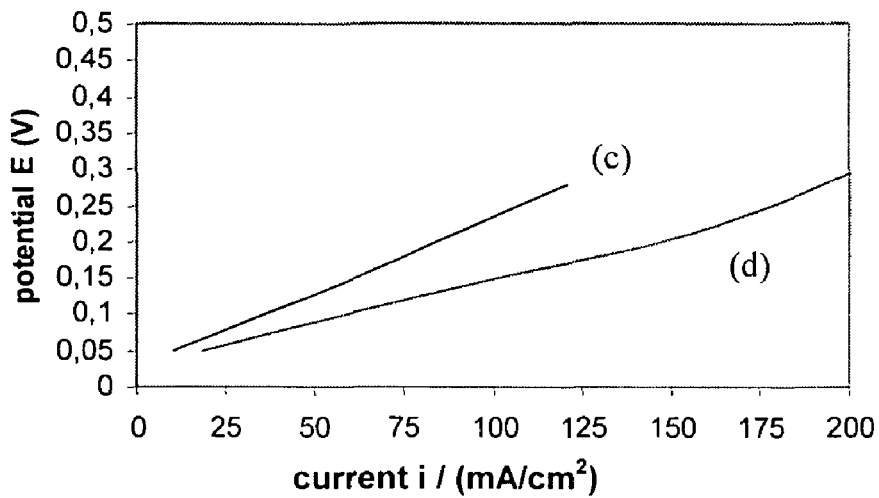
FIG. 2 shows a potentiodynamic plot of electrodes prepared by (c) adding the gelling agent to the zinc powder, then adding the binding agent, and (d) adding the binding agent to the zinc powder, then adding the gelling agent.

The samples were prepared by two different procedures. In the first method, the Carbopol 940 was added to the zinc powder and mixed with the application of mechanical energy. Then the PTFE was added. This is shown in FIG. 2 as sample (c). In the second method, the PTFE was first added to the zinc powder and mixed with the application of mechanical energy before the Carbopol 940 was finally added. This is shown in FIG. 2 as sample (d).

Once the last component (PTFE in the first procedure and Carbopol in the second procedure) was added, the whole mixture was mixed with the application of mechanical energy. To each of the zinc powder agglomerates, 0.6 ml of aqueous KOH electrolyte (6.6 M) was added in order to form a paste.

The paste was then coated on a nickel mesh used as a current collector. The mesh was bent and sandwiched over the anode layer to prepare the electrode.

Electrochemical measurement was carried out using the 1286 electrochemical interface Solartron. A Zn reference electrode and a Ni counter electrode were used. The electrolyte was an aqueous 6.6 M KOH solution. Several potentiodynamic and potentiostatic experiments were performed on the electrodes. The figures illustrate the benefit of the production method of the invention for a zinc electrode containing a binding agent.

FIG. 2 shows the result of electrochemical measurements on the electrodes. Sample (d) exhibits higher activity than the sample (c). In fact, twice the current density at equal potential is reached for (d) as compared to (c). This shows that the method of the invention may be used to produce electrodes containing a binding agent which have high activity.

In contrast to sample (c), the zinc particles in sample (d) are not affected very much by the swelling of the gelling agent. This is due to the direct contact between PTFE and the zinc particles. PTFE holds the zinc matrix together and a high zinc particle-particle contact area is thus obtained.

The example shows that a correct choice of preparation method results in high reaction rates when a binding agent is added to the zinc electrode.

Example 3

In order to optimize the amount of binding agent, zinc electrodes were synthesized with increasing amount of PTFE.

The first sample was prepared by mixing 5.6 g of zinc powder (consisting of 2 different particle fractions 50 wt %

GN10 and 50 wt % GN40) with 0.1 g of PTFE (1.7 wt %) and 0.1 g of Carbopol 940. This is shown in FIG. 3 as sample (e).

The second sample was prepared by mixing 5.6 g of zinc powder (consisting of 2 different particle sizes 50 wt % GN10 and 50 wt % GN40) with 0.2 g of PTFE (3.5 wt %) and 0.1 g of Carbopol 940. This is shown in FIG. 3 as sample (f).

The last sample was prepared by mixing 5.6 g of zinc powder (consisting of 2 different particle sizes 50 wt % GN10 and 50 wt % GN40) with 0.4 g of PTFE (6.9 wt %) and 0.1 g of Carbopol 940. This is shown in FIG. 3 as sample (g).

Figure 3:
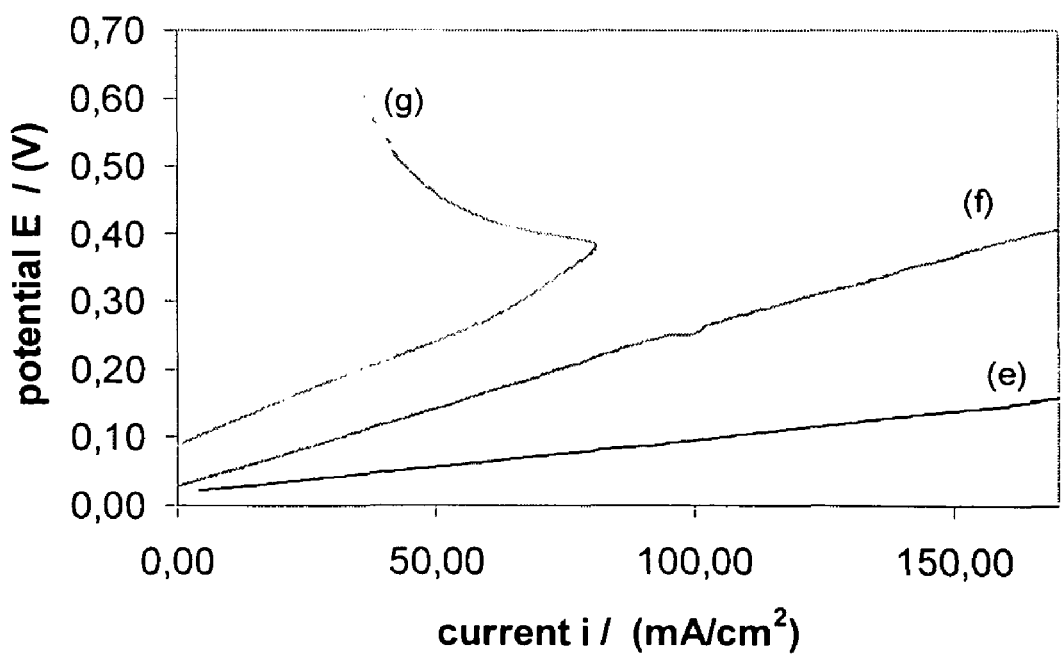
FIG. 3 shows a potentiodynamic plot of electrodes containing (e) 0.1 g PTFE, (f) 0.2 g PTFE and (g) 0.4 g PTFE.

FIG. 3 shows the results of the electrochemical experiments on the zinc electrodes. With increasing amount of PTFE the activity of the zinc electrode decreases.

Figure 4:
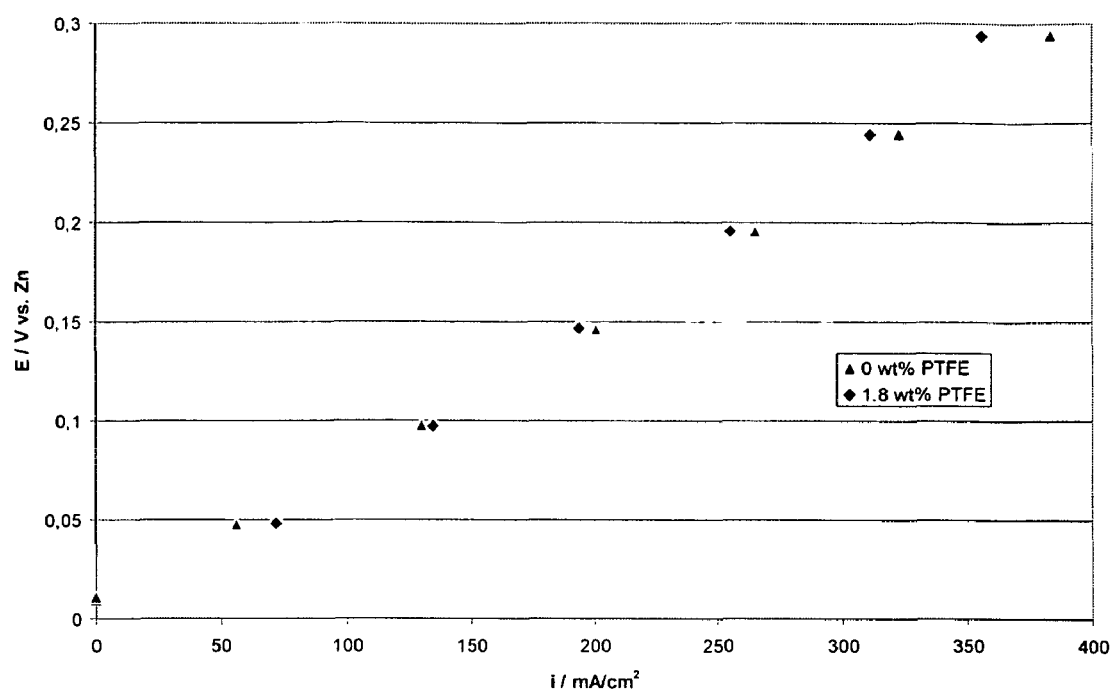
FIG. 4 shows a potentiodynamic plot of a sample prepared with 1.8 wt % PTFE compared with a sample without PTFE.

FIG. 4 is a comparative experiment. It shows a sample prepared with 1.8 wt % PTFE compared with a sample without PTFE. In order to prevent losses related to particle-particle contact due to the swelling of the electrode without PTFE, the electrode was pressed into a holding frame. The figure shows that when the amount of PTFE is below 2 wt % no negative effect of the PTFE content is observed.

The example shows that, if the binding agent is PTFE, the amount of binding agent should be <4 wt % to maintain high reaction rates without passive film formation.

Example 4

This example shows that the electrodes can undergo charge/discharge cycling without dendrite formation or unwanted shape changes due to the combined effect of adding a gelling agent and a binding agent.

Dendrite formation under repeated charge/discharge cycling of the zinc electrode is prevented by encapsulation of the zinc particles. To maintain the mechanical integrity of the electrode binding agents are added.

The zinc electrode (h) was obtained by mixing 5.6 g of zinc powder (consisting of 2 different particle fractions 50 wt % GN10 and 50 wt % GN40) with 0.1 g of PTFE (as the binding agent) and 0.1 g of Carbopol 940 (as the gelling agent). The zinc powder is a product of Grillo in Germany, the PTFE is a product of Dupont in USA and the Carbopol 940 is a product of BF Goodrich.

The samples were prepared by agglomerating PTFE with zinc powder before adding Carbopol 940. The whole mixture was mixed with the addition of mechanical energy, before 0.6 ml of aqueous KOH electrolyte (6.6 M) was added in order to form a paste.

The paste was coated on a nickel mesh acting as the current collector. The mesh was bent and sandwiched over the anode layer to prepare the electrode.

Electrochemical measurement was carried out using the 1286 electrochemical interface Solartron. A Zn reference electrode and a Ni counter electrode were used. The electrolyte was an aqueous 6.6 M KOH solution. Several potentiodynamic and potentiostatic experiments have been performed on the electrodes. The figures illustrate that dendrite formation can be reduced by the addition of a binding agent to the zinc electrode.

Figure 5:
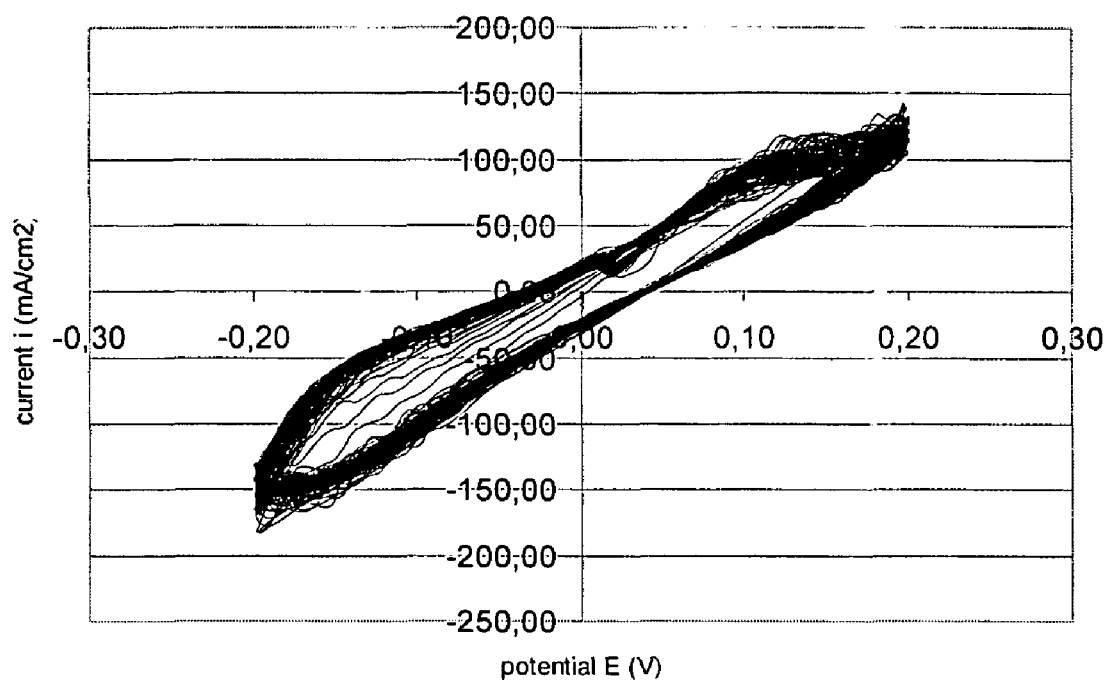
FIG. 5 shows a cyclic voltammogram (200 cycles) plot of sample (h) prepared in accordance with the method of the invention.

FIG. 5 shows the charge/discharge curves for the electrode. The figure shows that both the discharge and charge behavior of the electrode is reasonably stable and high current densities are obtained. The slow increase in the current can be explained by an increase of the active surface area after repeated cycling.

After 200 cycles the experiment was stopped. From visual inspection of the electrode no dendrite formation could be observed and the electrode did not suffer from shape changes.

As a comparative example a zinc electrode was prepared in a similar manner but without added PTFE. Dendrite formation was clearly seen on this sample.

Example 5

This example shows that adding small amounts of metal oxides will increase the reaction rate of the zinc electrode.

A first zinc electrode (l) was prepared by mixing up 5.4 g of zinc powder (50 wt % GN40 and 50 wt % GN10 particle size powder) with 0.1 g of calcium zincate, 0.1 g of $Ag_2O$ and 0.1 g of PTFE. The mixture was mixed with the addition of mechanical energy, and then 0.1 g of Carbopol 940 was added. After mixing all the powders together, 0.6 ml of aqueous 6.6 M KOH was slowly added to form a paste.

A second zinc electrode (m) was prepared by mixing up 5.4 g of zinc powder (50 wt % GN40 and 50 wt % GN10 particle size powder) with 0.1 g of calcium zincate and 0.1 g of PTFE. The mixture was mixed with the application of mechanical energy, and then 0.1 g of Carbopol 940 was added. After mixing all the powders together, 0.6 ml of aqueous 6.6 M KOH was slowly added to form a paste.

The paste was coated on a nickel mesh acting as the current collector. The mesh was bent and sandwiched over the anode layer to prepare the electrode.

Electrochemical measurement was carried out using the 1286 electrochemical interface Solartron. A Zn reference electrode and a Ni counter electrode were used. The electrolyte was an aqueous 6.6 M KOH solution. Several potentiodynamic and potentiostatic experiments have been performed on the electrodes. The figures illustrate the additional benefit of the components in the zinc electrode.

Figure 6:
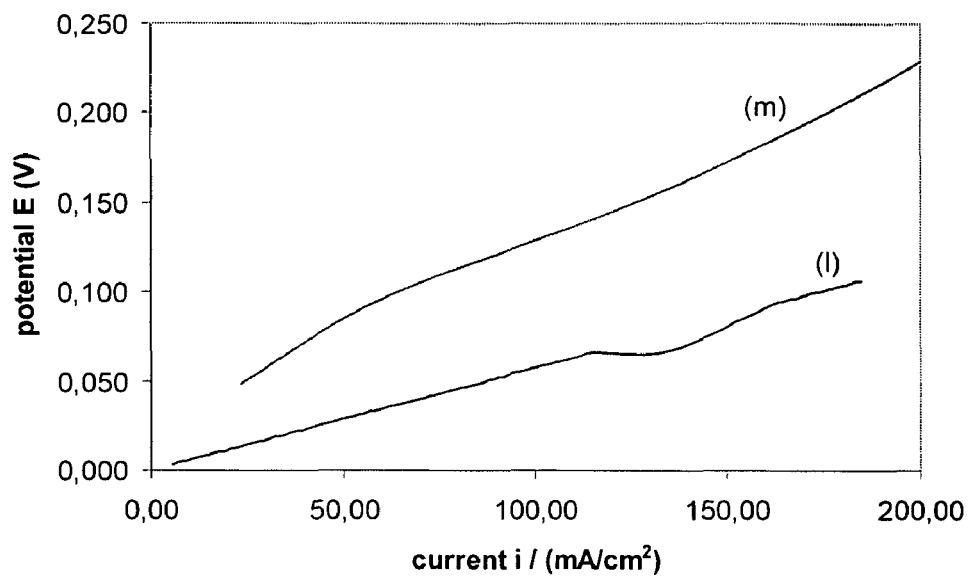
FIG. 6 shows potentiodynamic sweeps of zinc electrodes with (l) and without (m) $Ag_2O$.

FIG. 6 shows the potentiodynamic curve for the sample containing $Ag_2O$ (l) and the sample without silver oxide (m). As can be seen from the figure, when silver oxide is added to the zinc electrode an increase in the reaction rates is obtained.

Figure 7:
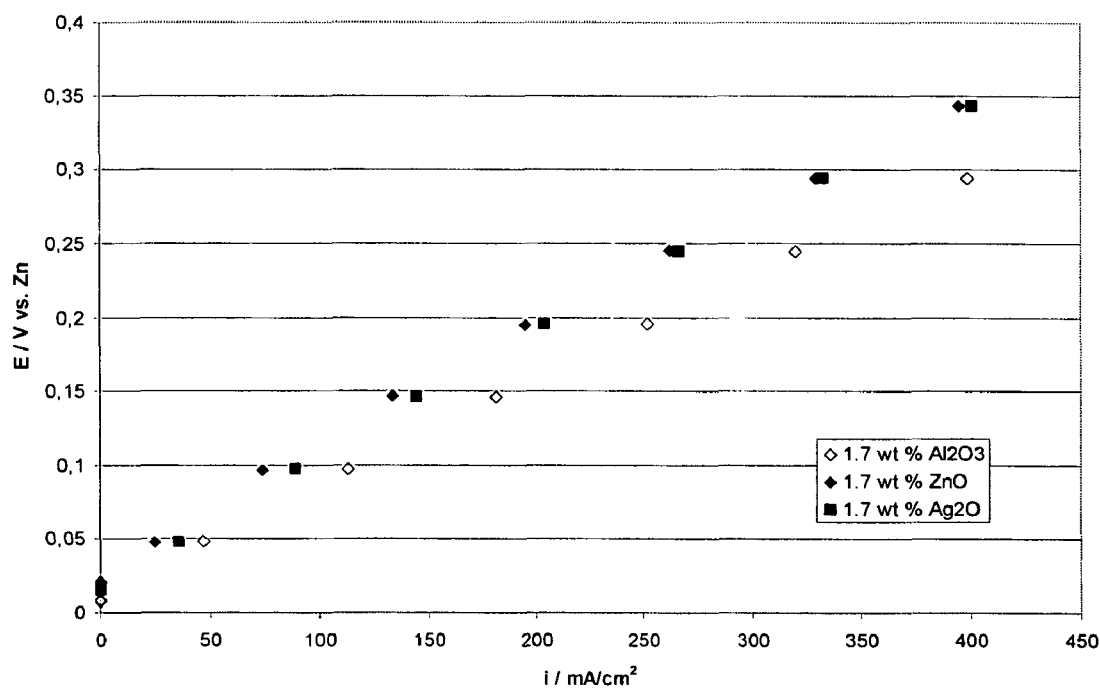
FIG. 7 shows potentiodynamic sweeps of zinc electrodes containing $Ag_2O$, $ZnO$ or $Al_2O_3$.

FIG. 7 shows the potentiodynamic curve for samples containing various metal oxides. These electrodes were prepared in the same way as those described above and in addition to zinc powder, PTFE and Carbopol 940, these electrodes also contained 0.2 wt % calcium zincate and:

(i) 1.7 wt % $Al_2O_3$;
(ii) 1.7 wt % ZnO;
(iii) 1.7 wt % $Ag_2O$.

As can be seen from the figure all of the metal oxide additives gave an increased reaction rate for the zinc electrode.

Figure 8:
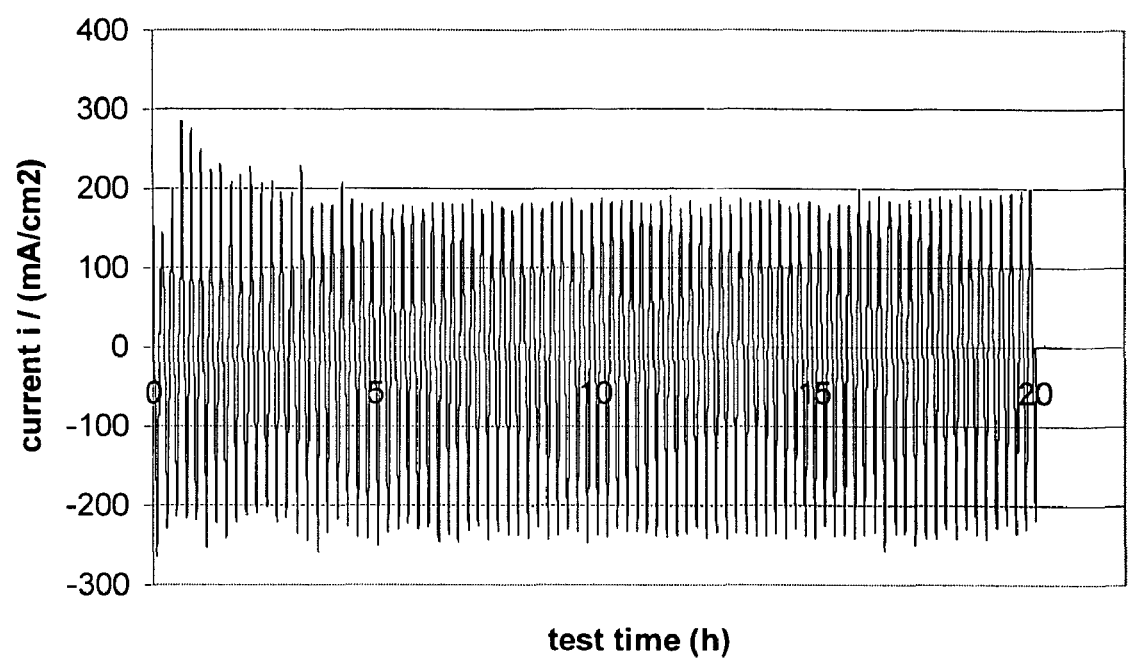
FIG. 8 shows a cyclic voltammogram plot of a zinc electrode containing silver oxide (n). The cycles were performed between −200 mV vs. Zn to +200 mV vs. Zn.

FIG. 8 shows cyclic sweeps of a zinc electrode containing silver oxide (n). The figure shows stable charge/discharge behavior of the electrode. No dendrite formation was observed even after several hundred cycles.

Example 6

This example shows that adding small amounts of metal oxides will increase the reaction rate of the zinc electrode. The effect of CoO on the electrochemical behavior of zinc electrodes has been investigated by performing cycling tests.

A first zinc electrode was prepared by mixing up 5.4 g zinc powder (particle size 70-100 µm) and 0.1 g of PTFE. The mixture was mixed with the addition of mechanical energy, and then 0.1 g of Carbopol 940 was added. After mixing all the powders together, 0.6 ml of aqueous 6.6 M KOH was slowly added to form a paste.

A second zinc electrode was prepared by mixing up 5.4 g of zinc powder with 0.1 g of PTFE and 1 weight % CoO. The mixture was mixed with the application of mechanical energy, and then 0.1 g of Carbopol 940 was added. After mixing all the powders together, 0.6 ml of aqueous 6.6 M KOH was slowly added to form a paste.

The paste was coated on a nickel mesh acting as the current collector. The mesh was bent and sandwiched over the anode layer to prepare the electrode.

Electrochemical measurement was carried out on half-cells, using Zn as reference electrode and a Ni as counter electrode. The electrolyte was an aqueous 6.6 M KOH solution.

Figure 9:
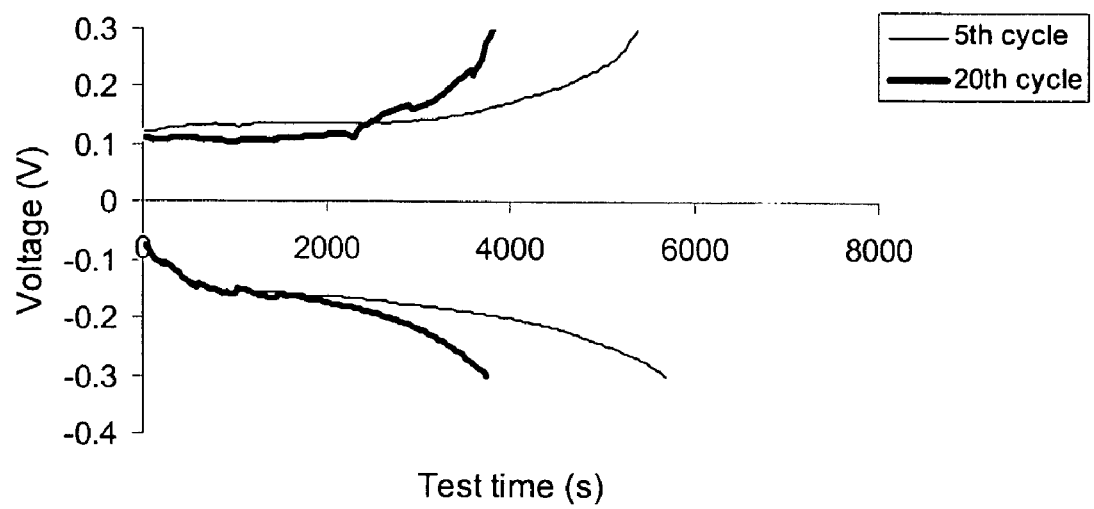
FIG. 9 shows discharge/charge performance of a zinc electrode sample with no additives.
Figure 10:
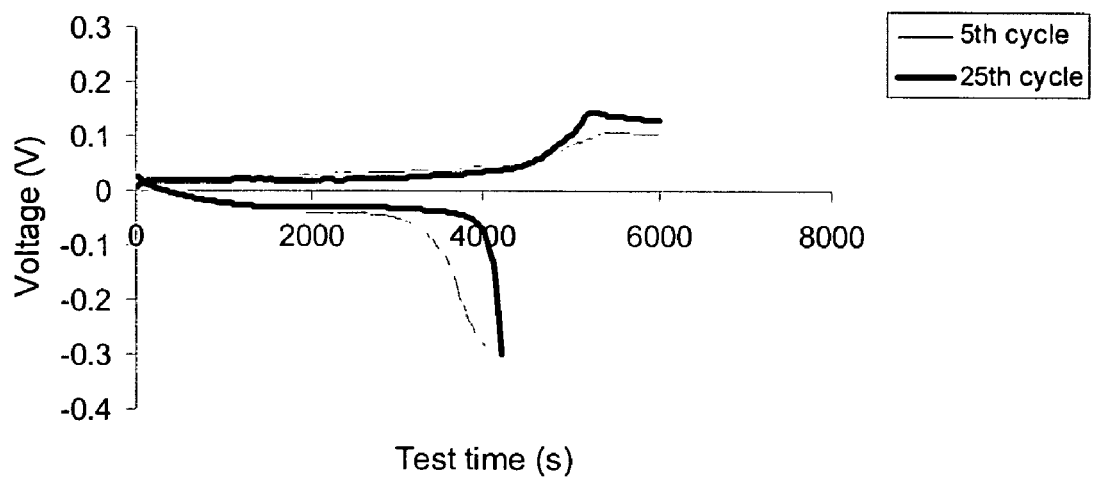
FIG. 10 shows discharge/charge performance of a zinc electrode sample containing 1 weight % CoO.

FIG. 9 shows the discharge and charge performance at C/4 rate for the sample without CoO. For the $5^{th}$ and $20^{th}$ cycle, an average voltage of about −150 mV in discharge and 120 mV in charge was obtained for this electrode. FIG. 10 shows the discharge and charge performance at C/4 rate for the sample with 1% CoO. For the $5^{th}$ and $25^{th}$ cycle, an average voltage of about −30 mV in discharge and 30 mV in charge was obtained. Hence, the anode containing CoO obtained higher reaction rates than for the anode without CoO.

Another effect of adding CoO to the anode is an improvement in cycle stability of the cell. FIG. 9 shows a loss in capacity of about 34% from the $5^{th}$ to the $20^{th}$ cycle for the sample with no CoO. Although the addition of CoO causes a small decrease of the cell capacity, as seen in FIG. 10, the overall cycling behavior is improved by exhibiting only a 3% loss in capacity form the $5^{th}$ to the $20^{th}$ cycle.

The experiment shows that by adding small amounts of cobalt oxide to the zinc electrode, the reaction rate was improved. The experiment also showed that adding cobalt oxide improved the cycle stability of the cell.

Example 7

To increase the charge/discharge stability and prevent dendrite formation calcium zincate can be added to the zinc electrode. The example shows that by adding an increasing amount of calcium zincate to the zinc electrode increased stability is obtained. The example also shows that high reaction rates with calcium zincate are obtained by the addition of metal oxides.

Calcium zincate was prepared by slowly adding CaOH to a ZnO saturated KOH solution with continuous stirring (molar ratio of Zn:Ca=2:1), the solution was rested for one hour, and then the liquid was decanted off. The solid product containing mainly calcium zincate $Ca(OH)_2 \cdot nZn(OH)_2 \cdot nH_2O$ was rinsed with distilled water 3 times. The deposited product was then dried in an oven (70° C., for 48 hours).

A first zinc electrode (i) was prepared by mixing up 4.76 g of zinc powder (50 wt % GN40 and 50 wt % GN10) with 0.84 g of $Ca(OH)_2 \cdot nZn(OH)_2 \cdot nH_2O$ (14.5 wt %) and 0.1 g of PTFE. The powders were then mixed with the application of mechanical energy, and 0.1 g of Carbopol 940 was added. After mixing all powders together, 0.6 ml of aqueous 6.6 M KOH was slowly added to form a paste.

A second zinc electrode (j) was prepared by mixing up 5.5 g of zinc powder (50 wt % GN40 and 50 wt % GN10 particle size powder) with 0.11 g of $Ca(OH)_2 \cdot nZn(OH)_2 \cdot nH_2O$ (1.9 wt %) and 0.1 g of PTFE. The powders were then mixed with the application of mechanical energy, and then 0.1 g of Carbopol 940 was added. After mixing all powders together, 0.6 ml of aqueous 6.6 M KOH was slowly added to form a paste.

A third zinc electrode (k) was prepared by mixing up 5.22 g of zinc powder (50 wt % GN40 and 50 wt % GN10 particle size powder) with 0.28 g of $Ca(OH)_2 \cdot nZn(OH)_2 \cdot nH_2O$ (4.9 wt %) and 0.1 g of PTFE. The powders were then mixed with the application of mechanical energy, and then 0.1 g of Carbopol 940 was added. After mixing all powders together, 0.6 ml of aqueous 6.6 M KOH was slowly added to form a paste.

The paste was coated on a nickel mesh acting as the current collector. The mesh was bent and sandwiched over the anode layer to prepare the electrode.

Electrochemical measurement was carried out using the 1286 electrochemical interface Solartron. A Zn reference electrode and a Ni counter electrode were used. The electrolyte was an aqueous 6.6 M KOH solution. Several potentiodynamic and potentiostatic experiments have been performed on the electrodes.

Figure 11:
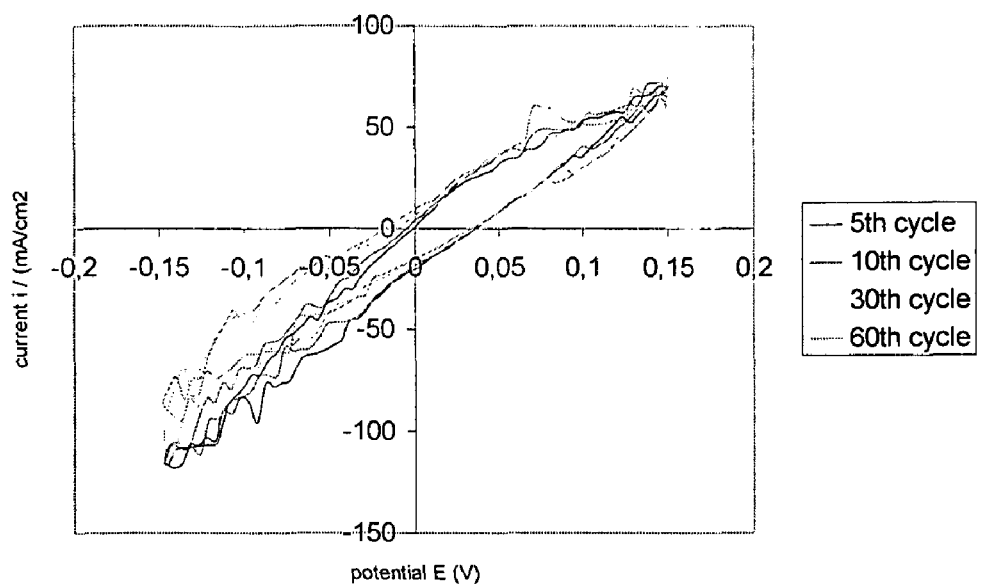
FIG. 11 shows a cyclic voltammogram plot of a zinc electrode containing 14.5 wt % calcium zincate (i)

FIG. 11 shows cyclic sweeps of the zinc electrode (i) containing 14.5 wt % calcium zincate. The addition of calcium zincate improves the charge/discharge stability of the electrode. A decrease in the reaction rate is observed. No dendrite formation was observed.

Figure 12:
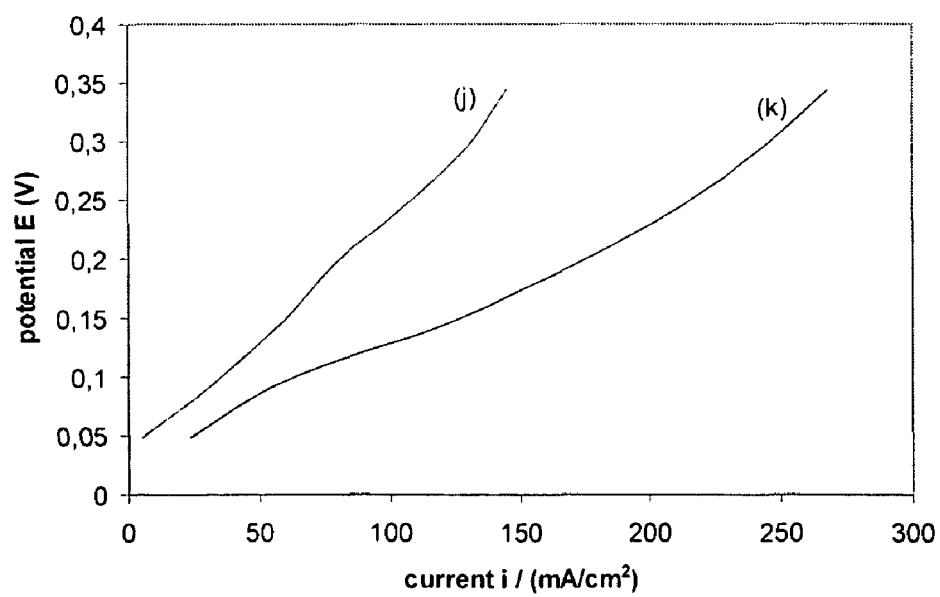
FIG. 12 shows potentiodynamic sweeps of zinc electrodes containing 4.9 wt % calcium zincate (j) and 1.9 wt % calcium zincate (k)

FIG. 12 potentiodynamic sweeps of the zinc electrodes containing 1.9 wt % calcium zincate (j) and 4.9 wt % calcium zincate (k). As the amount of calcium zincate is reduced the reaction rate of the zinc electrode increases.

To obtain good charge/discharge stability of the zinc electrodes calcium zincate can be added. Undesirably, as shown, this reduces the reaction rate of the zinc electrode.

Figure 13:
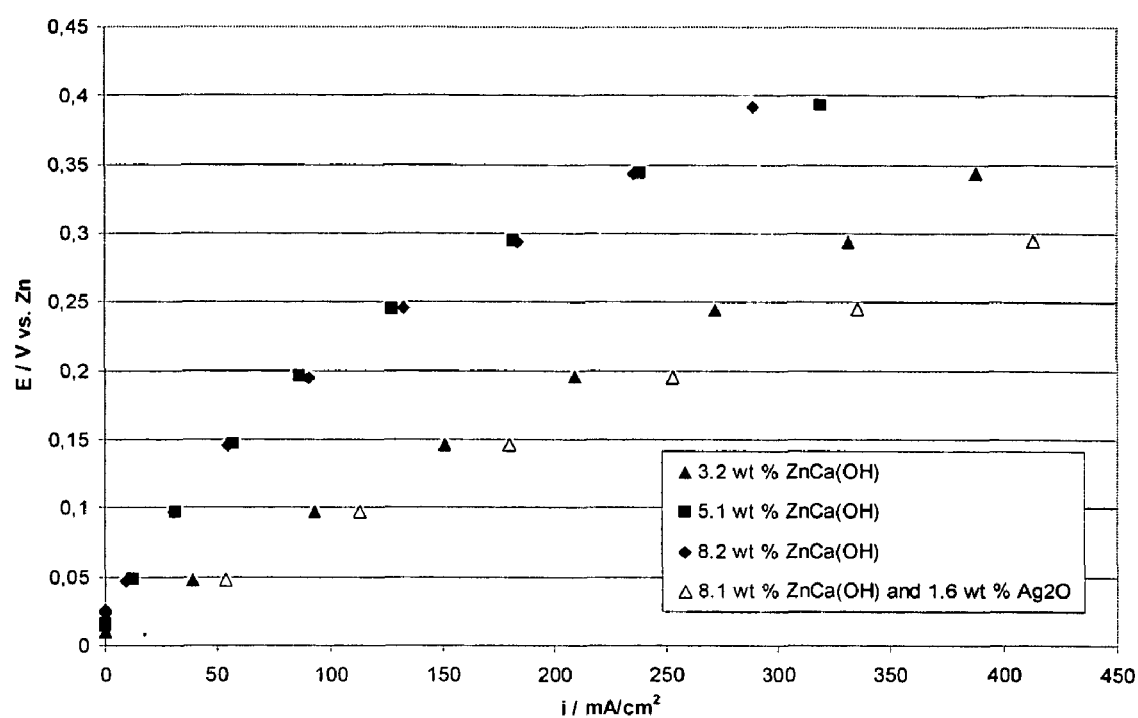
FIG. 13 shows the potentiodynamic sweep of a zinc electrode containing 8.2 wt % calcium zincate and 1.6 wt % $Ag_2O$. As comparative examples, samples with calcium zincate concentrations of 3.2 wt %, 5.1 wt % and 8.2 wt % without $Ag_2O$ are included. All samples were made in accordance with the method of the invention.

However, high reaction rates can be maintained for zinc electrodes containing larger amounts of calcium zincate by the addition of an activator. FIG. 13 shows the potentiodynamic sweep for a zinc electrode containing 8.2 wt % calcium zincate and 1.6 wt % $Ag_2O$. As comparative examples, samples with calcium zincate concentrations of 8.2 wt %, 5.1 wt % and 3.2 wt % and without $Ag_2O$ are included. All samples are made according to the method described above. The example clearly shows that high concentrations of calcium zincate can be used without the loss in activity by addition of a small amount of activator material such as $Ag_2O$. As shown in Example 5 and 6 other activator materials based on metal oxides can be used.

The invention claimed is:

1. A secondary battery comprising:
    a negative electrode comprising an active material and a current collector, the active material comprising:
    agglomerates comprising zinc powder, an organic binding agent, calcium zincate, and an electro-active material, the electro-active material comprising at least one material selected from the group consisting of silver oxide and aluminum oxide; and
    an organic gelling agent forming an ionic conductive three-dimensional structure that encapsulates the agglomerates.

2. The secondary battery of claim 1, wherein the electro-active material is present in the active material in an amount less than 8 weight percent.

3. The secondary battery of claim 1, wherein the electro-active material is present in the active material in an amount less than 2 weight percent.

4. The secondary battery of claim 1, wherein the electro-active material comprises aluminum oxide.

5. The secondary battery of claim 1, wherein the active material further comprises at least one material selected from the group consisting of antimony, gallium, thallium, cadmium, and oxides and hydroxides thereof.

6. The secondary battery of claim 1, wherein the active material further comprises at least one material selected from the group consisting of indium, bismuth, mercury, tin, lead, and oxides and hydroxides thereof.

7. The secondary battery of claim 1, wherein the current collector is a nickel mesh current collector.

8. The secondary battery of claim 1, wherein the organic binding agent is selected from the group consisting of polytetrafluoroethylene, polyethylene, polypropylene, and rubber polymers.

9. The secondary battery of claim 1, wherein the calcium zincate is present in an amount of less than 5 weight percent.

10. The secondary battery of claim 1, wherein the zinc powder has a particle size distribution by weight such that:
   at least 90 percent of the particles have a size within the range 5 to 400 µm;
   at least 25 percent of the particles are large particles with a size of 100 µm or greater; and
   at least 25 percent of the particles are small particles with a size of less than 100 µm.

11. The secondary battery of claim 1, wherein at least 25 percent of the particles of the zinc powder have a size greater that 200 micrometers.

12. The secondary battery of claim 1, wherein the zinc powder has at least 30 percent particles with a size greater than 200 micrometers and at least 30 percent particles with a size less than 100 micrometers.

13. The secondary battery of claim 1, wherein the zinc powder is formed as a mixture of first and second zinc powders, the first zinc powder comprising predominantly large particles with a size of 100 micrometers or greater and the second zinc powder comprising predominantly small particles with a size of 100 micrometers or less.

14. The secondary battery of claim 13, wherein the first zinc powder has at least 90% by weight of particles in the range 75 to 400 µm and the second zinc powder has at least 80% by weight particles less than 100 µm.

15. The secondary battery of claim 13, wherein the zinc powder consists of the first and second zinc powders in a weight ratio of 1:4 to 4:1.

16. The secondary battery of claim 1, wherein the gelling agent is selected from the group consisting of carboxymethyl cellulose, methyl cellulose, hydroxypropyl methyl cellulose, polyvinyl alcohol, polyethylene oxide, polyacrylate, and salts thereof.

17. The secondary battery of claim 1, wherein the gelling agent is present in an amount from 0.5 weight percent to 2 weight percent.

18. The secondary battery of claim 1, wherein the binding agent is present in an amount of 4 weight percent or less.

19. A zinc-air battery comprising:
   a negative electrode for the zinc-air battery comprising an active material and a current collector, the active material comprising:
      zinc powder;
      an organic gelling agent;
      an organic binding agent;
      calcium zincate; and
      an electro-active material that includes at least one material selected from the group consisting of silver oxide and aluminum oxide;
   wherein the organic gelling agent defines a structure that encapsulates agglomerates formed of the zinc powder, organic binding agent, calcium zincate, and electro-active material.

20. The zinc-air battery of claim 19, wherein the electro-active material is present in the active material in an amount less than 8 weight percent.

21. The zinc-air battery of claim 19, wherein the electro-active material comprises aluminum oxide.

22. The zinc-air battery of claim 19, wherein the electro-active material comprises silver oxide.

23. The zinc-air secondary battery of claim 19, wherein the active material further comprises at least one material selected from the group consisting of antimony, gallium, thallium, cadmium, indium, bismuth, mercury, tin, lead, and oxides and hydroxides thereof.

24. The zinc-air battery of claim 19, wherein the current collector is a nickel mesh current collector.

25. The zinc-air battery of claim 19, wherein the organic binding agent is selected from the group consisting of polyethylene, polypropylene, and rubber polymers.

26. The zinc-air battery of claim 19, wherein the calcium zincate is present in an amount of less than 5 weight percent.

27. The zinc-air battery of claim 19, wherein the zinc powder has a particle size distribution by weight such that:
   at least 90 percent of the particles have a size within the range 5 to 400 µm;
   at least 25 percent of the particles are large particles with a size of 100 µm or greater; and
   at least 25 percent of the particles are small particles with a size of less than 100 µm.

28. The zinc-air battery of claim 19, wherein the zinc powder is formed as a mixture of first and second zinc powders, the first zinc powder comprising predominantly particles with a size of 100 micrometers or greater and the second zinc powder comprising predominantly particles with a size of 100 micrometers or less.

29. The zinc-air battery of claim 19, wherein the organic gelling agent is selected from the group consisting of carboxymethyl cellulose, methyl cellulose, hydroxypropyl methyl cellulose, polyvinyl alcohol, polyethylene oxide, polyacrylate, and salts thereof.

30. The zinc-air battery of claim 19, wherein the organic gelling agent is present in an amount from 0.5 weight percent to 2 weight percent.

31. The zinc-air battery of claim 19, wherein the binding agent is present in an amount of 4 weight percent or less.

32. An active material for a secondary battery comprising zinc powder mixed with an organic gelling agent, an organic binding agent, calcium zincate, and aluminum oxide, wherein the organic gelling agent defines a three-dimensional structure that encapsulates agglomerates within the active material, the agglomerates including the zinc powder and organic binding agent.

33. The active material of claim 32, wherein the active material comprises less than 8 weight percent aluminum oxide.

34. The active material of claim 32, wherein the active material further comprises at least one material selected from the group consisting of antimony, gallium, thallium, cadmium, indium, bismuth, mercury, tin, lead, and oxides and hydroxides thereof.

35. The active material of claim 32, wherein the organic binding agent is selected from the group consisting of polytetrafluoroethylene, polyethylene, polypropylene, and rubber polymers and the organic gelling agent is selected from the group consisting of carboxymethyl cellulose, methyl cellulose, hydroxypropyl methyl cellulose, polyvinyl alcohol, polyethylene oxide, polyacrylate, and salts thereof.

36. The active material claim 32, wherein the zinc powder has a particle size distribution by weight such that:
   at least 90 percent of the particles have a size within the range 5 to 400 µm;
   at least 25 percent of the particles are large particles with a size of 100 µm or greater; and
   at least 25 percent of the particles are small particles with a size of less than 100 µm.

37. A zinc-air battery comprising:
a negative electrode for the rechargeable zinc-air battery comprising an active material and a current collector, the active material comprising:
agglomerates comprising zinc powder, an organic binding agent, calcium zincate, and cobalt oxide; and
an organic gelling agent encapsulating the agglomerates.

38. The zinc-air battery of claim 37, wherein the active material further comprises at least one material selected from the group consisting of antimony, gallium, thallium, cadmium, and oxides and hydroxides thereof.

39. The zinc-air battery of claim 37, wherein the active material further comprises at least one material selected from the group consisting of indium, bismuth, mercury, tin, lead, and oxides and hydroxides thereof.

40. The zinc-air battery of claim 37, wherein the current collector is a nickel mesh current collector.

41. The zinc-air battery of claim 37, wherein the organic binding agent is selected from the group consisting of polytetrafluoroethylene, polyethylene, polypropylene, and rubber polymers.

42. The zinc-air battery of claim 37, wherein the calcium zincate is present in an amount of less than 5 weight percent.

43. The zinc-air battery of claim 37, wherein the zinc powder has a particle size distribution by weight such that:
at least 90 percent of the particles have a size within the range 5 to 400 µm;
at least 25 percent of the particles are large particles with a size of 100 µm or greater; and
at least 25 percent of the particles are small particles with a size of less than 100 µm.

44. The zinc-air battery of claim 37, wherein the gelling agent is selected from the group consisting of carboxymethyl cellulose, methyl cellulose, hydroxypropyl methyl cellulose, polyvinyl alcohol, polyethylene oxide, polyacrylate, and salts thereof.

45. The zinc-air battery of claim 37, wherein the zinc powder has at least 30 percent particles with a size greater than 200 micrometers and at least 30 percent particles with a size less than 100 micrometers.

* * * * *